US012812639B2

(12) United States Patent
Xu et al.

(10) Patent No.: US 12,812,639 B2
(45) Date of Patent: Nov. 24, 2026

(54) PDCCH DETECTION METHOD, APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Jing Xu, Dongguan (CN); Bin Liang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 213 days.

(21) Appl. No.: 18/745,475

(22) Filed: Jun. 17, 2024

(65) Prior Publication Data

US 2024/0340895 A1 Oct. 10, 2024

Related U.S. Application Data

(63) Continuation of application No. PCT/CN2021/144007, filed on Dec. 31, 2021.

(51) Int. Cl.

*H04L 5/00* (2006.01)
*H04L 1/00* (2006.01)
*H04W 72/1268* (2023.01)
*H04W 72/231* (2023.01)
*H04W 72/51* (2023.01)

(52) U.S. Cl.

CPC ....... *H04W 72/1268* (2013.01); *H04L 1/0038* (2013.01); *H04W 72/231* (2023.01); *H04W 72/51* (2023.01)

(58) Field of Classification Search

None

See application file for complete search history.

(56) References Cited

U.S. PATENT DOCUMENTS 11,889,502 B2 1/2024 Huang et al.
12,641,581 B2 5/2026 Huang et al.
2021/0092760 A1 3/2021 Nam et al.
2021/0314973 A1 10/2021 Liu et al.

(Continued)

FOREIGN PATENT DOCUMENTS

CN 109089316 A 12/2018
CN 110034842 A 7/2019
CN 110972319 A 4/2020

(Continued)

OTHER PUBLICATIONS

PCT International Search Report for International Application No. PCT/CN2021/144007 dated Sep. 6, 2022.

(Continued)

*Primary Examiner* — Minh Trang T Nguyen
(74) *Attorney, Agent, or Firm* — Quarles & Brady LLP

(57) ABSTRACT

This application relates to a PDCCH detection method, an apparatus, a device, and a storage medium. According to the PDCCH detection method, a terminal device receives PDCCH configuration information corresponding to a first carrier and transmitted by a network device, and performs PDCCH detection based on the PDCCH configuration information to obtain DCI. The DCI is used to schedule one or more carriers, so that one or more carriers may be scheduled by using one piece of DCI.

16 Claims, 6 Drawing Sheets

(56) References Cited

U.S. PATENT DOCUMENTS

| | | | | |
|---|---|---|---|---|
| 2021/0410120 | A1* | 12/2021 | Takeda | H04W 72/0453 |
| 2022/0167320 | A1* | 5/2022 | Lee | H04L 5/0094 |

FOREIGN PATENT DOCUMENTS

| | | | |
|---|---|---|---|
| CN | 111865484 | A | 10/2020 |
| CN | 112398577 | A | 2/2021 |
| WO | 2021172851 | A1 | 9/2021 |
| WO | 2021202976 | A1 | 10/2021 |
| WO | 2021203276 | A1 | 10/2021 |

OTHER PUBLICATIONS

PCT Written opinion for International Application No. PCT/CN2021/144007 dated Sep. 6, 2022.

"New WID on Multi-carrier enhancements" of NTT Docomo, Inc., 3GPP TSG RAN Meeting # 94e Elextronic Meeting RP-213577 dated Dec. 6-17, 2021.

PCT International Search Report for International Application No. PCT/CN2021/143899 dated Jul. 27, 2022.

PCT Written opinion for International Application No. PCT/CN2021/143899 dated dated Jul. 27, 2022.

USPTO, Non-final Office Action for U.S. Appl. No. 18/751,732, dated Jun. 3, 2026, 19 pages.

* cited by examiner

PDCCH DETECTION METHOD, APPARATUS, DEVICE, AND STORAGE MEDIUM

CROSS-REFERENCE TO RELATED APPLICATIONS

This application is a continuation of International Application No. PCT/CN2021/144007, filed on Dec. 31, 2021, the disclosure of which is hereby incorporated by reference in its entirety.

TECHNICAL FIELD

This application relates to the field of communications technologies, and in particular, to a PDCCH detection method, an apparatus, a device, and a storage medium.

RELATED ART

Downlink control information (DCI for short) is used to provide related control information when PDSCH/PUSCH transmission is scheduled in cell uplink and downlink directions. A terminal may perform PDCCH detection based on a PDCCH related parameter configured by a base station, to acquire DCI.

SUMMARY

In view of this, it is necessary to provide a PDCCH detection method, an apparatus, a device, and a storage medium for a technical problem of how to perform PDCCH detection when one or more carriers are scheduled by one piece of DCI.

According to a first aspect, an embodiment of this application provides a PDCCH detection method, where the method includes:

- receiving, by a terminal, PDCCH configuration information corresponding to a first carrier transmitted by a network device; and
- performing, by the terminal, PDCCH detection based on the PDCCH configuration information to obtain DCI, where the DCI is used to schedule one or more carriers.

According to a second aspect, an embodiment of the present invention provides a PDCCH detection method, where the method includes:

- transmitting, by a network device to a terminal, PDCCH configuration information corresponding to a first carrier, where the PDCCH configuration information is used to instruct the terminal to perform PDCCH detection based on the PDCCH configuration information to obtain DCI, where the DCI is used to schedule one or more carriers.

According to a third aspect, an embodiment of the present invention provides a terminal device, where the terminal device includes:

- a receiving module, configured to receive PDCCH configuration information corresponding to a first carrier and transmitted by a network device; and
- a detection module, configured to perform PDCCH detection based on the PDCCH configuration information to obtain DCI, where the DCI is used to schedule one or more carriers.

According to a fourth aspect, an embodiment of the present invention provides a network device, where the network device includes a processing module and a transmitting module.

The processing module is configured to transmit, to a terminal, PDCCH configuration information corresponding to a first carrier; and the PDCCH configuration information is used to instruct the terminal to perform PDCCH detection based on the PDCCH configuration information to obtain DCI, where the DCI is used to schedule one or more carriers.

According to a fifth aspect, an embodiment of the present invention provides a terminal device, including a processor, a memory, and a transceiver. The processor, the memory, and the transceiver communicate with each other by using an internal connection channel, and the memory is configured to store program code.

The processor is configured to invoke the program code stored in the memory to cooperate with the transceiver in implementing a step of the foregoing methods.

According to a sixth aspect, an embodiment of the present invention provides a network device, including a processor, a memory, and a transceiver, where the processor, the memory, and the transceiver communicate with each other by using an internal connection channel.

The memory is configured to store program code.

The processor is configured to invoke the program code stored in the memory to cooperate with the transceiver in implementing a step of any one of the foregoing methods.

According to a seventh aspect, an embodiment of the present invention provides a computer-readable storage medium, where a computer program is stored on the computer-readable storage medium, and the computer program is executed by a processor to implement a step of any one of the foregoing methods.

According to an eighth aspect, an embodiment of the present invention provides a chip, where the chip includes a processing circuit, configured to invoke a computer program from a memory and run the computer program, to cause a device installed with the chip to execute any one of the foregoing methods.

According to a ninth aspect, an embodiment of the present invention provides a computer program product, where the computer program product includes computer program instructions, and the computer program instructions cause a computer to execute any one of the foregoing methods.

According to a tenth aspect, an embodiment of the present invention provides a computer program, where the computer program causes a computer to execute any one of the foregoing methods.

According to embodiments of this application, a terminal device receives PDCCH configuration information corresponding to a first carrier and transmitted by a network device, and performs PDCCH detection based on the PDCCH configuration information to obtain DCI. The DCI is used to schedule one or more carriers, so that one or more carriers may be scheduled by using one DCI.

DESCRIPTION OF EMBODIMENTS

In order to make objectives, technical solutions and advantages of this application clearer, the following further describes this application in detail with reference to accompanying drawings and embodiments. It should be understood that specific embodiments described herein are merely used to explain this application, rather than limiting this application.

Figure 1:
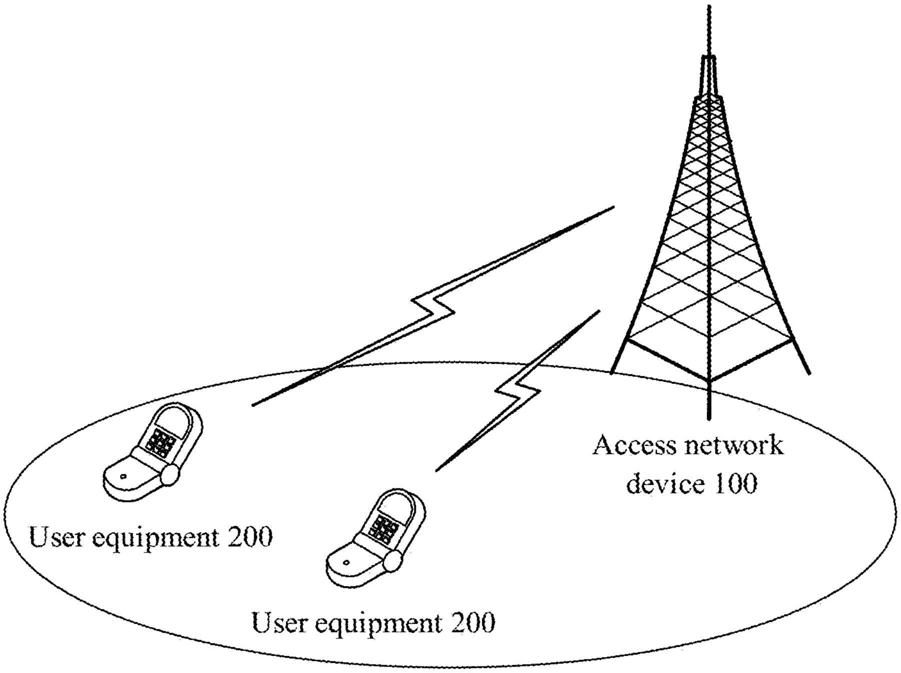
FIG. 1 is a schematic diagram of a communications system to which a technical solution according to this application is applicable.

FIG. 1 is a schematic diagram of a communications system to which a technical solution according to this application is applicable. The communications system may include a network device 100 and a user equipment 200. FIG. 1 is only a schematic diagram, and does not constitute a limitation on an applicable scenario of a technical solution provided in this application.

The network device 100 may be a transmission reception point (TRP), abase station, a relay station, an access point, or the like. The network device 100 may be a network device in a 5G communications system or a network device in a future evolved network, or may be a wearable device, a vehicle-mounted device, or the like. In addition, alternatively, the network device 100 may be a base transceiver station (base transceiver station, BTS) in a global system for mobile communication (GSM) or a code division multiple access (CDMA) network, may be an NB (NodeB) in wideband code division multiple access (WCDMA), or may be an eNB or an eNodeB (evolutional NodeB) in long term evolution (LTE). The network device 100 may alternatively be a wireless controller in a cloud radio access network (CRAN) scenario. The following uses a base station as an example for description in this application.

The user equipment 200 includes a personal digital assistant (PDA), a handheld device having a wireless communication function, a computing device or another processing device connected to a wireless modem, a vehicle-mounted device, a wearable device, a user equipment in a 5G network, a user equipment in a future evolved public land mobile network (PLMN) network, and the like.

Figure 2:
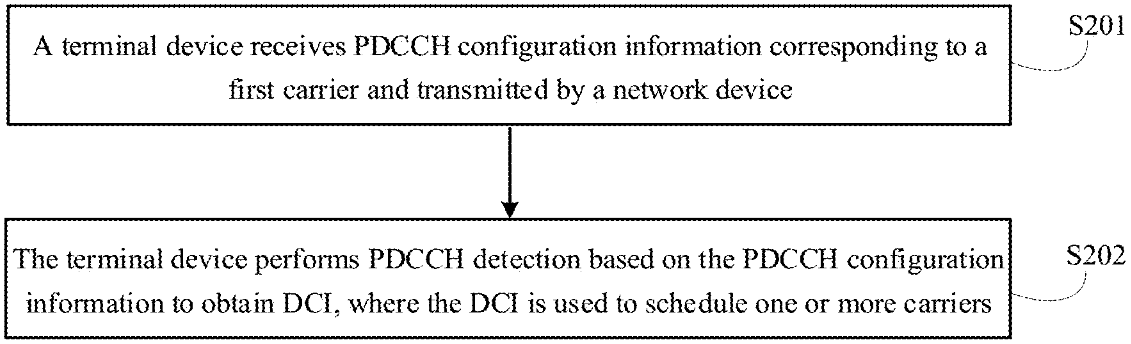
FIG. 2 is a schematic flowchart of a PDCCH detection method according to an embodiment.

Based on the communications system shown in FIG. 1, this embodiment provides a PDCCH detection method. Referring to FIG. 2, FIG. 2 is a schematic flowchart of a PDCCH detection method according to an embodiment. The method includes the following steps.

S201. A terminal device receives PDCCH configuration information corresponding to a first carrier and transmitted by a network device.

In embodiments provided in this application, concepts of “serving cell” and “carrier” are the same, and may be used interchangeably. For example, the PDCCH configuration information corresponding to the first carrier and transmitted by the network device may be understood as the PDCCH configuration information corresponding to a first serving cell and transmitted by the network device.

The network device may configure one piece of PDCCH configuration information for the first carrier, or the network device configures a plurality of pieces of PDCCH configuration information for the first carrier, where the plurality of pieces of PDCCH configuration information are in a one-to-one correspondence with a plurality of bandwidth parts (BWP) of the first carrier. In this application, that one carrier is configured with one PDCCH configuration is used as an example, and a case in which one carrier is configured with a plurality of PDCCH configurations is also applicable.

Figure 3:
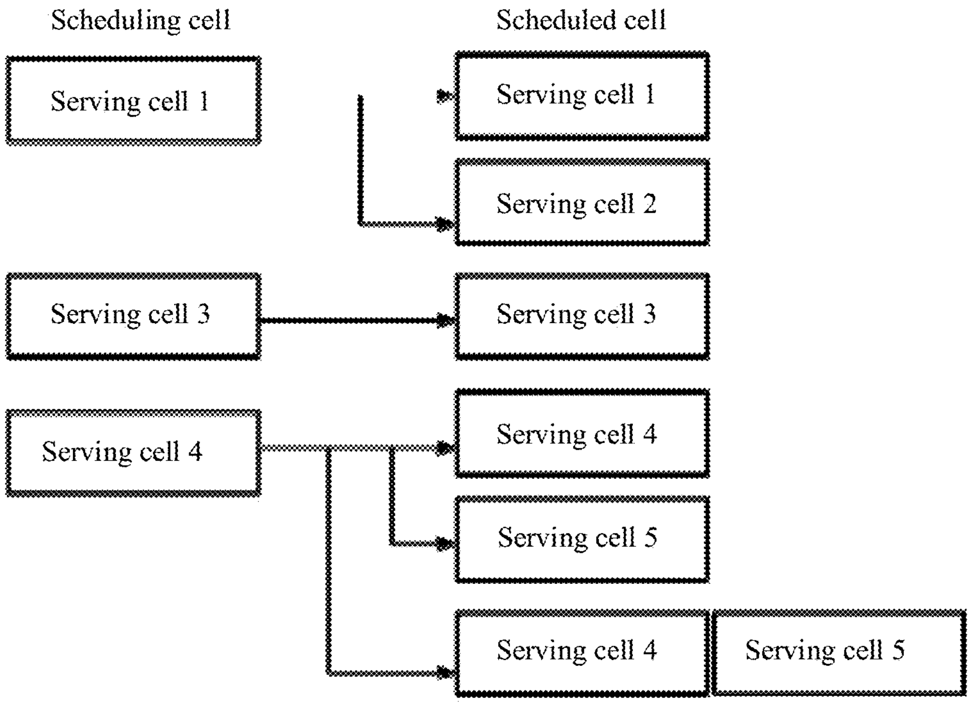
FIG. 3 is a schematic diagram of a multi-carrier scheduling relationship according to an embodiment.

This step is described herein with reference to FIG. 3. FIG. 3 is a schematic diagram of a multi-carrier scheduling relationship according to an embodiment. For example, if a first serving cell includes a serving cell 1, a serving cell 3, and a serving cell 4, PDCCH configuration information corresponding to the first serving cell includes PDCCH configuration information of the serving cell 1, PDCCH configuration information of the serving cell 3, and PDCCH configuration information of the serving cell 4 that are transmitted by the network device.

The network device configures five serving cells (serving cell 1 to cell 5) for the terminal device by using higher layer signalling. The five serving cells belong to a same cell group. For example, the serving cell 1 to cell 5 all belong to, for example, a master cell group (MCG), or all belong to a primary PUCCH group/secondary cell group, and a scheduling relationship between serving cells configured for the terminal device by using higher layer signalling is shown in FIG. 3. The serving cells 1 to 5 each may be scheduled as a separate cell, and the serving cell 4 and the serving cell 5 may be scheduled together.

The terminal device obtains PDCCH configuration information separately configured by the network device for the serving cell 1 to serving cell 5. In some embodiments, each piece of PDCCH configuration information includes, for example, PDCCH-Config, SearchSpace, and ControlResourceSet.

When the first serving cell includes the serving cells 1 to 5, a network needs to configure PDCCH configuration information for the serving cells 1 to 5. For example, the network configures a first PDCCH configuration for the serving cell 1, the network configures a second PDCCH configuration for the serving cell 2, and so on. Specifically, the network configures first PDCCH-Config, first SearchSpace and first ControlResourceSet for the serving cell 1, configures second PDCCH-Config, second SearchSpace and second ControlResourceSet for the serving cell 2, and so on.

One piece of PDCCH configuration information may include PDCCH configuration information of one first carrier, or may include PDCCH configuration information of a plurality of first carriers. For example, one piece of PDCCH configuration information may include PDCCH configuration information of the serving cell 1, or may include PDCCH configuration information of the serving cell 1, PDCCH configuration information of the serving cell 2, and PDCCH configuration information of the serving cell 3.

S202. The terminal device performs PDCCH detection based on the PDCCH configuration information to obtain DCI, where the DCI is used to schedule one or more carriers.

DCI is an abbreviation of Downlink control information, and represents downlink control information.

As shown in FIG. 3, for example, the terminal device may perform PDCCH detection based on PDCCH configuration information corresponding to the serving cell 4. Because a PDCCH is used to carry DCI, when the PDCCH is detected, DCI carried in the PDCCH may be obtained. The DCI is used to schedule one carrier, for example, the DCI is used to schedule the serving cell 4 or the serving cell 5. Alternatively, the DCI is used to schedule a plurality of carriers. For example, the DCI is used to schedule the serving cell 4 and the serving cell 5, that is, the DCI is used to schedule two serving cells: the serving cell 4 and the serving cell 5; that is, schedule two carriers.

In some embodiments, one carrier scheduled by the DCI is the first carrier, or the plurality of carriers scheduled by the DCI include the first carrier.

For example, as shown in FIG. 3, same PDCCH configuration information is shared for scheduling the serving cell 4 and scheduling both the serving cell 4 and the serving cell 5. After receiving the PDCCH configuration information of the serving cell 4, the terminal device performs PDCCH detection based on the PDCCH configuration information to obtain DCI. The DCI is used to schedule one carrier, that is, the DCI is used to schedule the serving cell 4, where the serving cell 4 is one carrier scheduled by the DCI, and the serving cell 4 is the first carrier. Alternatively, the DCI is used to schedule a plurality of carriers, that is, the DCI is used to schedule the serving cell 4 and the serving cell 5, that is, the DCI is used to schedule two carriers. In this case, the first carrier is the serving cell 4, and the serving cell 4 and the serving cell 5 are two carriers scheduled by the DCI. It should be noted that, same PDCCH configuration information is shared for scheduling the serving cell 4 and scheduling both the serving cell 4 and the serving cell 5, so that signalling overheads can be reduced.

According to the PDCCH detection method provided in this embodiment, a terminal device receives PDCCH configuration information corresponding to a first carrier and transmitted by a network device, and performs PDCCH detection based on the PDCCH configuration information to obtain DCI. The DCI is used to schedule one or more carriers, so that one or more carriers may be scheduled by using one DCI.

In some embodiments, the DCI includes first indication information, and the first indication information is used to indicate one or more scheduled carriers.

On the basis of foregoing embodiments, the first indication information may be set in the DCI, and the first indication information is used to indicate one or more scheduled carriers. For example, a value of the first indication information is used to identify whether to schedule the serving cell 4 or the serving cell 5, or to schedule a combination of the serving cell 4 and the serving cell 5. The first indication information is used to identify whether to schedule one carrier or to schedule a plurality of carriers.

In some embodiments, the first indication information includes a CIF field. A value of the CIF field is used to indicate one or more scheduled carriers.

For example, for the scheduled serving cell 1 or the scheduled serving cell 2 shown in FIG. 3, a value of only one CIF field needs to be configured. For the scheduled serving cell 4 or the scheduled serving cell 5, a value of one CIF field may be configured, or a value of a plurality of CIF fields may be configured.

For the scheduled serving cell 4 or the scheduled serving cell 5, a case in which a value of one CIF field is configured is as follows: A value of a CIF field of the serving cell 4 is configured as 0, and a value of a CIF field of the serving cell 5 is configured as 1, that is, when a value of a CIF field is equal to 0, it means to schedule the serving cell 4; when a value of a CIF field is equal to 1, it means to schedule the serving cell 5. For scheduling of the serving cell 4 and the serving cell 5, a value of CIF fields of the serving cell 4 and the serving cell 5 is configured as 2. When the value of the CIF field is equal to 2, it means that the serving cell 4 and the serving cell 5 are scheduled. Values of different CIF fields are used to distinguish between scheduled carriers, so that the scheduled carriers can be identified especially in a case in which search spaces of a plurality of scheduled carriers overlap, and thus the terminal device can correctly determine a scheduled carrier.

It should be noted that the value of the CIF in this embodiment of this application is merely used as an example, which is not limited thereto.

In some embodiments, the terminal device may further receive a cross-carrier configuration delivered by the network device, for example, CrossCarrierSchedulingConfig. A network configures a first cross-carrier configuration for the serving cell 1, the network configures a second cross-carrier configuration for the serving cell 2, and so on. For example, specifically, the network device configures first CrossCarrierSchedulingConfig for the serving cell 1, the network device configures second CrossCarrierSchedulingConfig for the serving cell 2, and so on. In cross-carrier configuration, for example, in CrossCarrierSchedulingConfig, for the serving cell 1 and serving cell 3, a value of only one CIF needs to be configured. For the serving cells 4 and 5, one or more scheduled carriers may alternatively be indicated in the following manner. For example, a current carrier scheduling mode may be configured for the serving cell 4, for example, the value is own. A cross-carrier scheduling mode is configured for the serving cell 5, but a value of a CIF field is configured as 1, which indicates that the value of the CIF field of the serving cell 5 is 1. A current carrier scheduling mode may be configured for the serving cell 4, for example, the value is own, which indicates that when CIF=0, the serving cell 4 is correspondingly scheduled. In addition, in a cross-carrier scheduling mode, for example, the value is other, but a value of a CIF field is configured as 1. In this case, a combination of the serving cell 4 and the serving cell 5 are correspondingly scheduled, that is, a plurality of carriers are correspondingly scheduled. A cross-carrier scheduling mode is configured for the serving cell 5, and a value of a CIF field is configured as 2, which indicates that the value of the CIF field of the serving cell 5 is 2.

In one embodiment, if the first indication information is used to indicate a plurality of scheduled carriers, the first indication information includes a CIF field and another information field, different from the CIF field, in DCI. In some embodiments, the another information field may include at least one of FDRA, TDRA, NDI, and HARQ process. It should be noted that the another information field includes, but is not limited to, FDRA, TDRA, NDI, and HARQ process. FDRA is an abbreviation of frequency domain resource assignment, and indicates frequency domain resource allocation; TDRA is time domain resource assignment, and indicates time domain resource allocation; NDI is an abbreviation of New Data Indicator, and indicates a new data indicator; HARQ is an abbreviation of hybrid automatic repeat request, and indicates a hybrid automatic repeat request, and HARQ process indicates a HARQ process.

In a case in which one piece of DCI is used for scheduling one PDSCH/PUSCH in the serving cell 4 or the serving cell 5, that is, in a case in which one piece of DCI is used for scheduling one carrier, the network device indicates a value of a corresponding CIF field in the DCI, for example, CIF=0, indicating scheduling the serving cell 4; CIF=1, indicating scheduling the serving cell 5. PDSCH is an abbreviation of Physical Uplink Share CHannel, and indicates a physical uplink shared channel; and PDSCH is an abbreviation of Physical Downlink Share CHannel, and indicates a physical downlink shared channel.

In a case in which one piece of DCI is used for scheduling a plurality of PDSCH/PUSCHs in the serving cell 4 and the serving cell 5, that is, in a case in which one DCI schedules a plurality of carriers, a network side indicates, in the DCI, a value of a CIF field corresponding to the serving cell 4 or the serving cell 5, for example, CIF=0, indicating that one piece of DCI is used for scheduling the serving cell 4 or scheduling both the serving cell 4 and the serving cell 5, that is, a value of a same CIF field is shared for scheduling the serving cell 4 and scheduling both the serving cell 4 and the serving cell 5, where the value is equal to 0. Specifically, scheduling the serving cell 4 or scheduling both the serving cell 4 and the serving cell 5 may be determined based on a specific information field in the DCI, for example, the specific information field includes, but is not limited to, at least one of FDRA, TDRA, NDI, HARQ process, and the like. The FDRA is used as an example for description. When CIF=0 and a frequency domain resource indicated in the FDRA is only in the serving cell 4, it indicates that the DCI is used for scheduling the serving cell 4. When CIF=0 and a frequency domain resource indicated in the FDRA is in the serving cell 4 and the serving cell 5, it indicates that the DCI is used for scheduling both the serving cell 4 and the serving cell 5. HARQ is an abbreviation of Hybrid Automatic Repeat reQuest, and indicates a hybrid automatic repeat request.

It should be noted that, in a case in which CIF=0 indicates scheduling the serving cell 4 or scheduling both the serving cell 4 and the serving cell 5, that is, a value of a same CIF field is shared for scheduling the serving cell 4 and scheduling both the serving cell 4 and the serving cell 5, that is, when CIF=0, it indicates that the serving cell 4 may be scheduled, or both the serving cell 4 and the serving cell 5 may be scheduled, specifically, a value of a same CIF field is shared for both the serving cell 4 and the serving cell 5 and which serving cell.

In some embodiments, the first indication information is configured by using higher layer signalling or is determined by using a predetermined rule.

For example, with reference to foregoing examples, in a case in which a value of one CIF field is configured for the scheduled serving cell 4 or the scheduled serving cell 5 by using higher layer signalling configuration, the network device indicates a value of a corresponding CIF field in the DCI, for example, CIF=0, indicating scheduling the serving cell 4; CIF=1, indicating scheduling the serving cell 5. In addition, for a combination of the serving cell 4 and the serving cell 5, CIF=0 is configured, that is, a value of a same CIF field is used in scheduling the combination of the scheduling serving cell 4 and the serving cell 5 and scheduling the serving cell 4, or a higher layer indicates a serving cell ID with a same value, that is, the higher layer indicates that a value of a CIF field is shared for scheduling the combination of the serving cell 4 and the serving cell 5 and scheduling which serving cell, for example, serving cell Index for CIF=Serving cell 4, that is, indicating that a value of a CIF field is shared for scheduling the combination of the scheduling serving cell 4 and the serving cell 5 and scheduling the serving cell 4.

It should be noted that, a value of a same CIF field is shared for scheduling the combination of the scheduling serving cell 4 and the serving cell 5 and scheduling the serving cell 4, so that a scheduled carrier can be identified especially in a case in which search spaces of a plurality of scheduled carriers overlap, and thus the terminal device can correctly determine a scheduled carrier.

Alternatively, the first indication information may be determined by using a predetermined rule. For a case in which a plurality of carriers are scheduled by DCI, for example, a value of same first indication information is shared for scheduling a combination of the serving cell 4 and the serving cell 5 and scheduling a serving cell with the smallest serving cell ID in a combination of multiple serving cells. For another example, a value of same first indication information is shared for scheduling a combination of the serving cell 4 and the scheduling serving cell 5 and scheduling a serving cell with the largest bandwidth of an active bandwidth part (BWP) in a combination of multiple serving cells. The foregoing combination of multiple serving cells is, for example, a combination of the serving cell 4 and the serving cell 5.

In an embodiment, the PDCCH detection method may further include:

performing, by the terminal device, DCI size alignment on DCI formats configured by the PDCCH configuration information.

The DCI size alignment means that, for example, for two DCI formats with different DCI lengths, zeros may be padded at the end of a shorter DCI format to make the shorter DCI format have a same length with a longer DCI format; or truncation is performed on the longer DCI format to make the longer DCI format have a same length with the shorter DCI format. A total number of DCI sizes can be reduced by performing a DCI size alignment operation.

For the DCI size alignment, new radio (NR) supports the terminal device in performing PDCCH blind detection in search space sets configured on a network side. The so called "blind detection" means that the terminal device does not know information such as a DCI format before DCI carried in a PDCCH is detected. Therefore, some fixed DCI sizes need to be used to perform blind detection on a PDCCH candidate set in a search space set. To reduce complexity of blind detection performed by the terminal device on a PDCCH, not only a DCI format, an aggregation level, and a candidate set size in the aggregation level for blind detection in each search space are limited by using configuration of higher layer signalling, but also a number of DCI sizes for blind detection on each scheduled carrier is constrained, thereby further reducing complexity of blind detection performed by the terminal device. For example, when the terminal device is configured with more than three types of DCI formats scrambled by using a C-RNTI, DCI size alignment is performed to make a number of DCI sizes to remain three. In this way, when the terminal device performs blind detection, the blind detection is performed on only three DCI sizes, without needing to perform blind detection on each DCI format, and the terminal device may distinguish between different DCI formats with a same DCI size by reading content in DCI. Currently, it is agreed in a protocol that for a scheduled carrier (cell), a number of DCI sizes is not greater than 4, and a number of DCI sizes scrambled by using the C-RNTI is not greater than 3. Therefore, the terminal device performs DCI size alignment on DCI formats configured by the PDCCH configuration information corresponding to the first carrier, so as to be consistent with specification in the protocol. C-RNTI is an abbreviation of Cell-RadioNetworkTemporaryIdentifier, and indicates a cell radio network temporary identifier.

In some embodiments, the performing, by the terminal device, DCI size alignment on DCI formats configured by the PDCCH configuration information may be implemented in the following manner:

performing, by the terminal device, DCI size alignment on the DCI formats configured by the PDCCH configuration information if a number of DCI formats configured by the PDCCH configuration information is greater than a preset threshold.

In some embodiments, the performing, by the terminal device, DCI size alignment on DCI formats configured by the PDCCH configuration information may include at least one of the following:

performing DCI size alignment on at least two first-type DCI formats, where the first-type DCI format is used to schedule one carrier;

performing DCI size alignment on at least two second-type DCI formats, where the second-type DCI format is used to schedule at least two carriers; and performing DCI size alignment on the first-type DCI format and the second-type DCI format.

The first-type DCI format is a DCI format used to schedule one carrier, for example, DCI format 0_0, DCI format 0_1, DCI format 0_2, DCI format 1_0, DCI format 1_1, and DCI format 1_2 are DCI formats used to schedule one carrier. The second-type DCI format is used to schedule at least two carriers. In this embodiment, for example, DCI format 0_3 and DCI format 0_3 are used to schedule at least two carriers.

In one embodiment, the performing, by the terminal device, DCI size alignment on DCI formats configured by the PDCCH configuration information may include at least one of the following:

1. performing DCI size alignment on at least two first-type DCI formats, where the first-type DCI format is used to schedule one carrier; and the two first-type DCI formats include, for example, DCI format 0_2 and DCI format 1_2;
2. performing DCI size alignment on at least two second-type DCI formats, where the second-type DCI format is used to schedule one carrier; and the two second-type DCI formats include, for example, DCI format 0_1 and DCI format 1_1;
3. performing DCI size alignment on at least two third-type DCI formats, where the third-type DCI format is used to schedule at least two carriers; and the two third-type DCI formats include, for example, DCI format 0_3 and DCI format 1_3; and
4. performing DCI size alignment on the first-type DCI format and the second-type DCI format. The first-type DCI format in this step may be a first-type DCI format aligned after the step 2, and the second-type DCI format in this step may be a second-type DCI format aligned after the step 3.

The terminal device performs a DCI size alignment operation on a plurality of DCI formats of a same scheduled cell. When a DCI format for scheduling the serving cell 4 or the serving cell 5 is different from a DCI format for scheduling a combination of the serving cell 4 and the serving cell 5, and a number of DCI sizes scrambled by using a C-RNTI in the plurality of DCI formats exceeds 3, a DCI size alignment operation is first performed on DCI formats for scheduling one carrier. After the alignment operation, if the number of DCI sizes scrambled by using a C-RNTI still exceeds 3, a DCI size alignment operation is performed on a DCI format for scheduling one carrier and a DCI format for scheduling a carrier group, where the carrier group refers to, for example, the combination of the serving cell 4 and the serving cell 5. Typically, according to an existing rule, for at least four of DCI format 0_0, DCI format 0_1, DCI format 0_2, DCI format 1_0, DCI format 1_1, and DCI format 1_2, a size alignment operation is performed on uplink and downlink DCI with a same suffix number to obtain aligned DCI sizes, where the aligned DCI sizes are, for example, A, B, and C, respectively. For the same suffix number, for example, DCI format 0_0 and DCI format 1_0 have a same suffix number. When the terminal device is further configured with DCI formats 0_x and 1_x for scheduling a carrier combination, the DCI formats 0_x and 1_x are first aligned to obtain an aligned DCI size, where the aligned DCI size is, for example, D, and a value of x is, for example, equal to 3. After the alignment operation, if the number of DCI sizes scrambled by using a C-RNTI still exceeds 3, B and C are aligned to obtain an aligned DCI size E, and finally obtained DCI sizes are respectively A, E, and D.

For example, DCI formats 0_0, 0_1, 0_2, 0_3, 1_0, 1_1, 1_2, and 1_3 that are configured for a same scheduled cell of the terminal device are detected in a UE-specific search space (USS for short), and DCI formats 0_0 and 0_1 are detected in a common search space (CSS for short). If a number of different DCI sizes in DCI 0_0, 0_1, 0_2, 0_3, 1_0, 1_1, 1_2, and 1_3 exceeds 4, and the number of DCI sizes scrambled by using a C-RNTI exceeds 3, size alignment needs to be performed on the configured DCI formats. For the DCI formats scrambled by using a C-RNTI, steps of size alignment are as follows.

1. Size alignment is performed on DCI formats 0_0 and 1_0 configured in the common search space, and a size of DCI obtained after the alignment is A.

2. If a number of aligned DCI sizes does not meet a number limitation, size alignment is performed on DCI formats 0_0 and 1_0 that are configured in the UE-specific search space and DCI formats 0_0 and 1_0 that are configured in the common search space, and a size of DCI obtained after the alignment is A. In the step 1, a DCI size obtained after size alignment of the DCI formats 0_0 and 1_0 that are configured in the common search space is A. Therefore, in this step, the DCI size A obtained after alignment is used as a reference, and a DCI size obtained after size alignment of the DCI formats 0_0 and 1_0 that are configured in the UE-specific search space is also A.

3. If a number of DCI sizes aligned after the step 2 does not meet a number limitation, size alignment is performed on the DCI formats 0_2 and 1_2 that are configured in the UE-specific search space, and a DCI size obtained after the alignment is B.

4. If a number of DCI sizes aligned after the step 3 does not meet a number limitation, size alignment is performed on the DCI formats 0_1 and 1_1 that are configured in the UE-specific search space, and a DCI size obtained after the alignment is C.

5. If a number of DCI sizes aligned after the step 4 does not meet a number limitation, size alignment is performed on the DCI formats 0_3 and 1_3 that are configured in the UE-specific search space, and a number of DCI sizes obtained after the alignment is D.

6. If the number of DCI sizes aligned after the step 4 does not meet a number limitation, size alignment may be performed on the DCI obtained after alignment in the step 4 and the DCI obtained from the step 5, that is, after a size alignment is performed on C and D, an aligned DCI size E is obtained, and finally obtained DCI sizes are respectively A, B, and E.

In some embodiments, after the step 5 is completed, the step 6 may not be performed, and another alignment manner is used. For example, if the number of DCI sizes aligned after the step 4 does not meet a number limitation, DCI formats obtained after alignment of the step 3 and the step 4 may be further aligned, that is, B and C are aligned in size. If a DCI size obtained after the alignment is E, finally obtained DCI sizes are respectively A, E, and D.

The foregoing being not meet a number limitation means that a number of different DCI sizes exceeds 4, and a number of DCI sizes scrambled by using a C-RNTI exceeds 3.

Figure 4:
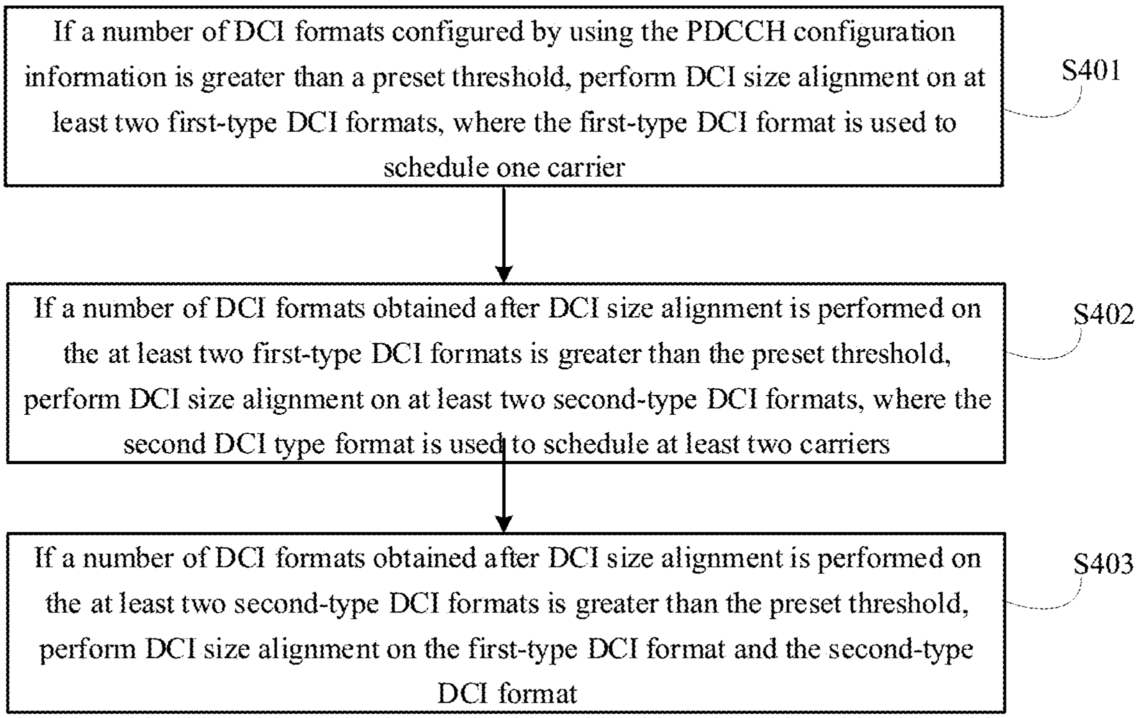
FIG. 4 is a schematic flowchart of an operation method of DCI size alignment according to an embodiment of this application.

In an embodiment, referring to FIG. 4, FIG. 4 is a schematic flowchart of an operation method of DCI size alignment according to an embodiment of this application. This embodiment relates to an implementation in some embodiments of performing, by the terminal device, DCI size alignment on the DCI formats configured by the PDCCH configuration information if a number of DCI formats configured by the PDCCH configuration information is greater than a preset threshold. On the basis of foregoing embodiments, the method may be implemented in the following manners:

S401. if a number of DCI formats configured by the PDCCH configuration information is greater than a preset threshold, performing DCI size alignment on at least two first-type DCI formats, where the first-type DCI format is used to schedule one carrier;

S402. if a number of DCI formats obtained after DCI size alignment is performed on the at least two first-type DCI formats is greater than the preset threshold, performing DCI size alignment on at least two second-type DCI formats, where the second DCI type format is used to schedule at least two carriers; and

S403. if a number of DCI formats obtained after DCI size alignment is performed on the at least two second-type DCI formats is greater than the preset threshold, performing DCI size alignment on the first-type DCI format and the second-type DCI format.

For example, with reference to the description in foregoing examples, DCI formats 0_0, 0_1, 0_2, 0_3, 1_0, 1_1, 1_2, and 1_3 that are configured for a same scheduled cell of the terminal device are detected in a UE-specific search space, and DCI formats 0_0 and 0_1 are detected in a common search space. After the operation in S401, that is, after the foregoing steps 1, 2, 3, and 4, a number of DCI formats obtained is 5, and the preset threshold is equal to 3. Therefore, that is, after a first DCI size alignment operation is performed, a number of DCI formats is 5, and the number is greater than the preset threshold. In this case, the foregoing step 5 needs to be further performed, that is, a second DCI size alignment operation needs to be performed on at least two second-type DCI formats, for example, a DCI size obtained after the alignment operation is D. After the operation in S402, a number of DCI formats obtained after the second DCI size alignment operation is equal to 4, and 4 is greater than the preset threshold. Therefore, a third DCI size alignment operation is performed on the first-type DCI format and the second-type DCI format, for example, the third DCI size alignment operation may be performed on C and D.

In this embodiment, a DCI size alignment operation is performed on DCI formats, so that a total number of DCI sizes is reduced, which can ensure that a requirement in a protocol is met, and a base station can successfully deliver DCI to a terminal device, and development complexity is low.

In some embodiments, the PDCCH detection method may further include the following step:

determining a PDCCH detection capability.

To ensure that a number of times of PDCCH detection configured by a network is within a range of a capability implemented by the terminal device, an NR protocol further specifies a PDCCH detection capability, which is intended to constrain PDCCH configuration on a network side. When blind detection or blind channel estimation required by a to-be-detected PDCCH configured by a network exceeds the PDCCH detection capability, the terminal device stops detecting a PDCCH on a remaining potential resource. For a multi-carrier system, a protocol requires that a PDCCH candidate resource configured by a network on a Scell does not exceed the PDCCH detection capability of the terminal device. A PDCCH candidate resource configured on a Pcell may exceed the PDCCH detection capability of the terminal device. However, in the case that the PDCCH candidate resource exceeds the PDCCH detection capability, the terminal device stops detecting a PDCCH on the remaining candidate resource.

In some embodiments, the PDCCH detection capability includes a maximum number of PDCCH candidates monitored by the terminal device and/or a maximum number of non-overlapped CCEs for channel estimation.

CCE is an abbreviation of channel control element, and indicates a channel control element.

In some embodiments, the maximum number of PDCCH candidates is a minimum value in M_max and M_total; and the M_max is a maximum number of times of blind detection of a terminal on one carrier, and the M_total is a sum of times of blind detection of all scheduled carriers of a specific numerology corresponding to a scheduling carrier.

In some embodiments, the maximum number of non-overlapped CCEs is a minimum value in C_max and C_total; and the C_max is a maximum number of times of blind channel estimation of a terminal on one carrier, and the C_total is a sum of times of blind channel estimation of all scheduled carriers of a specific numerology corresponding to a scheduling carrier.

In some embodiments, the M_max refers to the following $$M_{PDCCH}^{max,slot,\mu},$$

the M_total refers to the following $$M_{PDCCH}^{total,slot,\mu},$$

the C_max refers to the following $$C_{PDCCH}^{max,slot,\mu},$$

and the C_total refers to the following $$C_{PDCCH}^{total,slot,\mu}.$$

For a single-carrier system, a blind detection capability is agreed upon by $$M_{PDCCH}^{max,slot,\mu},$$

and $$C_{PDCCH}^{max,slot,\mu}.$$

For specific values, refer to Table 1 and Table 2, which indicate maximum numbers of times of blind detection performed by the terminal device on one carrier. The number of times of blind detection is related to a number of to-be-detected DCI sizes, an aggregation level, and a candidate set size in each aggregation level. For example, if two types of DCI formats are configured for one terminal device, the number of to-be-detected DCI sizes is also 2; and there are two aggregation levels, a size of a candidate location set corresponding to an aggregation level 1 is 4, and a size of a candidate location set corresponding to an aggregation level 2 is 8. In this case, the number of times of blind detection required by the terminal device is (4+8)*2=24. Herein $$C_{PDCCH}^{max,slot,\mu}$$

denotes a maximum number of non-PDCCH overlapped CCEs for channel estimation by a terminal device on one carrier. A number of non-overlapped CCEs for channel estimation is related to a time-frequency range of potential distribution and a precoding granularity of to-be-detected PDCCHs.

TABLE 1

| μ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

TABLE 2

| μ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

For a multi-carrier system, a PDCCH detection capability cannot be linearly increased with an increase in a number of carriers. Therefore, a maximum number of PDCCH candidates is constrained to constrain a total capability of PDCCH detection in a multi-carrier case. The maximum number of PDCCH candidates is only used to calculate the total capability of PDCCH detection, rather than limiting a number of scheduling carriers. Specifically, for each scheduled carrier, a maximum number of PDCCH candidates does not exceed $$\min\left(M_{PDCCH}^{max,slot,\mu}, M_{PDCCH}^{total,slot,\mu}\right),$$

and a maximum number of non-overlapped CCEs for channel estimation does not exceed $$\min\left(C_{PDCCH}^{max,slot,\mu}, C_{PDCCH}^{total,slot,\mu}\right).$$

For $$M_{PDCCH}^{max,slot,\mu} \text{ and } C_{PDCCH}^{max,slot,\mu},$$

refer to the foregoing tables. Herein $$M_{PDCCH}^{total,slot,\mu} \text{ and } C_{PDCCH}^{total,slot,\mu}$$

are determined in the following manner:

$$M_{PDCCH}^{total,slot,\mu} = \left\lfloor N_{cells}^{cap} \cdot M_{PDCCH}^{max,slot,\mu} \cdot \left(N_{cells}^{DL,\mu}\right) / \sum_{j=0}^{3} N_{cells}^{DL,j} \right\rfloor$$

$$C_{PDCCH}^{total,slot,\mu} = \left\lfloor N_{cells}^{cap} \cdot C_{PDCCH}^{max,slot,\mu} \cdot \left(N_{cells}^{DL,\mu}\right) / \sum_{j=0}^{3} N_{cells}^{DL,j} \right\rfloor$$

where $$N_{cells}^{cap}$$

denotes a maximum number of carriers for PDCCH detection by the terminal device, and indicates a PDCCH detection capability reported by the terminal device; and $$N_{cells}^{DL,j}$$

is a number of carriers whose numerology is j.

For the PDCCH detection capability, in consideration of enhancement of a PDCCH detection capability based on span and enhancement of a PDCCH detection capability in a multi-TRP scenario, an application of a DC scenario is correspondingly adjusted. Details are not described herein again. A principle and a process of determining a PDCCH detection capability in this application are also applicable to the foregoing enhanced technology.

With reference to the foregoing description, in this embodiment, the PDCCH detection capability may be determined in the following manners.

When a PDCCH for scheduling a combination including a serving cell x is to be configured by using a PDCCH corresponding to the serving cell x, both a number of PDCCH detection times for scheduling the combination including the serving cell x and a number of PDCCH detection times for scheduling the serving cell x are used to determine whether the PDCCH detection capability of the terminal device is met, and whether a discard operation needs to be performed. The PDCCH detection capability includes a maximum number of PDCCH candidates and a maximum number of non-overlapped CCEs for channel estimation. For example, when a PDCCH for scheduling a combination of the serving cell 4 and the serving cell 5 is configured by using a PDCCH corresponding to the serving cell 4, both a number of PDCCH detection times for scheduling the combination of the serving cell 4 and the serving cell 5 and a number of PDCCH detection times for scheduling the serving cell 4 are used to determine whether the PDCCH detection capability of the terminal device is met, and whether a discard operation needs to be performed. FIG. 3 is used as an example. μ configured by using an active BWP on scheduling carriers serving cell 1 and serving cell 3 that are corresponding to the serving cell 1, serving cell 2, and serving cell 3 is 0, μ configured by using an active BWP on scheduling carrier serving cell 4 corresponding to the serving cell 4 and serving cell 5 is 1, and a PDCCH detection capability reported by the terminal device is $$N_{cells}^{cap}=2.$$

In this case, descriptions according to a protocol are as follows.

For the serving cell 1, the serving cell 2, and the serving cell 3, a maximum number of PDCCH candidates does not exceed $$\min\left(M_{PDCCH}^{max,slot,\mu},\ M_{PDCCH}^{total,slot,\mu}\right),$$

and a maximum number of non-overlapped CCEs for channel estimation does not exceed $$\min\left(C_{PDCCH}^{max,slot,\mu},\ C_{PDCCH}^{total,slot,\mu}\right),$$

where $$M_{PDCCH}^{max,slot,\mu}\text{ and }C_{PDCCH}^{max,slot,\mu}$$

are shown in the foregoing Table 1 and Table 2.

Herein $$M_{PDCCH}^{total,slot,\mu}\text{ and }C_{PDCCH}^{total,slot,\mu}$$

are determined in the following manner:

$$M_{PDCCH}^{total,slot,\mu}=\left\lfloor 2\cdot M_{PDCCH}^{max,slot,\mu}\cdot 3/5\right\rfloor$$
$$C_{PDCCH}^{total,slot,\mu}=\left\lfloor 2\cdot C_{PDCCH}^{max,slot,\mu}\cdot 3/5\right\rfloor$$

For the serving cell 4 and the serving cell 5, a maximum number of PDCCH candidates does not exceed $$\min\left(M_{PDCCH}^{max,slot,\mu},\ M_{PDCCH}^{total,slot,\mu}\right),$$

and a maximum number of non-overlapped CCEs for channel estimation does not exceed $$\min\left(C_{PDCCH}^{max,slot,\mu},\ C_{PDCCH}^{total,slot,\mu}\right).$$

For $$M_{PDCCH}^{max,slot,\mu}\text{ and }C_{PDCCH}^{max,slot,\mu},$$

refer to the foregoing Table 1.

Herein $$M_{PDCCH}^{total,slot,\mu}\text{ and }C_{PDCCH}^{total,slot,\mu}$$

are determined in the following manner:

$$M_{PDCCH}^{total,slot,\mu}=\left\lfloor 2\cdot M_{PDCCH}^{max,slot,\mu}\cdot 2/5\right\rfloor$$
$$C_{PDCCH}^{total,slot,\mu}=\left\lfloor 2\cdot C_{PDCCH}^{max,slot,\mu}\cdot 2/5\right\rfloor$$

For a combination of the serving cell 4 and the serving cell 5, if a PDCCH for scheduling the combination of the serving cell 4 and the serving cell 5 is configured by using a PDCCH corresponding to the serving cell 4, both a number of PDCCH detection times for scheduling the combination of the serving cell 4 and the serving cell 5 and a number of PDCCH detection times for scheduling the serving cell 4 are used to determine whether the PDCCH detection capability of the terminal device is met, and whether a discard operation needs to be performed. Specifically, if the serving cell 4 is a primary cell (Pcell), when a PDCCH blind detection opportunity configured for scheduling the combination of the serving cell 4 and the serving cell 5 and scheduling the serving cell 4 exceeds $$\min\left(M_{PDCCH}^{max,slot,\mu},\ M_{PDCCH}^{total,slot,\mu}\right),$$

or a maximum number of non-overlapped CCEs for channel estimation is greater than a minimum value in $$C_{PDCCH}^{max,slot,\mu}\text{ and }C_{PDCCH}^{total,slot,\mu},$$

the terminal device stops detecting a search space with a low priority, for example, stops detecting a search space with a relatively large number. If the serving cell 4 is a secondary cell (Scell), a maximum number of PDCCH candidates for configuring a PDCCH and scheduling the combination of the serving cell 4 and the serving cell 5 and scheduling the serving cell 4 does not exceed a minimum value in $$M_{PDCCH}^{max,slot,\mu} \text{ and } M_{PDCCH}^{total,slot,\mu}$$

that is, the maximum number of PDCCH candidates is not greater than $$\min(M_{PDCCH}^{max,slot,\mu}, M_{PDCCH}^{total,slot,\mu}),$$

or a maximum number of non-overlapped CCEs for channel estimation is not greater than a minimum value in $$C_{PDCCH}^{max,slot,\mu} \text{ and } C_{PDCCH}^{total,slot,\mu},$$

that is, the maximum number of non-overlapped CCEs for channel estimation is not greater than $$\min(C_{PDCCH}^{max,slot,\mu}, C_{PDCCH}^{total,slot,\mu}).$$

In some embodiments, M_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, the M_total is determined based on a maximum number of carriers for PDCCH detection by the terminal device, a maximum number of times of blind detection performed by the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, C_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, C_total is determined based on a maximum number of carriers for PDCCH detection by the terminal device, a maximum number of times of blind channel estimation of the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

When total capability division is performed on a plurality of carriers, an adjustment coefficient is added. In some embodiments, the adjustment coefficient may be agreed upon by a protocol, or may be configured by using higher layer signalling, that is, when a number of scheduled carriers is counted, each scheduled carrier is multiplied by the adjustment coefficient. In some embodiments, the adjustment coefficient is a non-negative number. A manner agreed upon by a protocol may be determined based on a number of carrier combinations corresponding to the carrier. For example, if a PDCCH for scheduling a combination of the serving cell 4 and the serving cell 5 is configured by using a PDCCH corresponding to the serving cell 4, an adjustment coefficient is recorded as 2 when the serving cell 4 serves as a scheduled carrier for counting. The following examples are described based on protocol agreement, and are also applicable to the manner of configuration by using higher layer signalling.

FIG. 3 is used as an example. μ configured by using an active BWP on scheduling carriers serving cell 1 and serving cell 3 that are corresponding to the serving cell 1, serving cell 2, and serving cell 3 is 0, μ configured by using an active BWP on scheduling carrier serving cell 4 corresponding to serving cells 4 and 5 is 1, and a PDCCH detection capability $$N_{cells}^{cap} = 2$$

reported by the terminal device is equal to 2. In this case, according to manner 2, a carrier combination configured on each of the serving cell 1, the serving cell 2, and the serving cell 3 is 1; a carrier combination configured on the serving cell 4 is 2, that is, a carrier combination configured on the serving cell 4 includes the serving cell 4 and a combination of the serving cell 4 and the serving cell 5; and a carrier combination configured on the serving cell 5 is 1.

For the serving cell 1, the serving cell 2, and the serving cell 3, a maximum number PDCCH blind detection does not exceed $$\min(M_{PDCCH}^{max,slot,\mu}, M_{PDCCH}^{total,slot,\mu}),$$

and a maximum number of non-overlapped CCEs for channel estimation does not exceed $$\min(C_{PDCCH}^{max,slot,\mu}, C_{PDCCH}^{total,slot,\mu}),$$

where $$M_{PDCCH}^{max,slot,\mu}$$

denotes a maximum number of times of blind detection by the terminal device on one carrier, and $$C_{PDCCH}^{max,slot,\mu}$$

denotes a maximum number of times of blind channel estimation performed by the terminal device on one carrier. For $$M_{PDCCH}^{max,slot,\mu} \text{ and } C_{PDCCH}^{max,slot,\mu},$$

refer to the foregoing tables. Herein $$M_{PDCCH}^{total,slot,\mu} \text{ and } C_{PDCCH}^{total,slot,\mu}$$

are determined in the following manner:

$$M_{PDCCH}^{total,slot,\mu} = \lfloor 2 \cdot M_{PDCCH}^{max,slot,\mu} \cdot (1+1+1)/(1+1+1+2+1) \rfloor$$

$$C_{PDCCH}^{total,slot,\mu} = \lfloor 2 \cdot C_{PDCCH}^{max,slot,\mu} \cdot (1+1+1)/(1+1+1+2+1) \rfloor$$

It may be determined from the calculation formula of $$M_{PDCCH}^{total,slot,\mu}$$

that, $$M_{PDCCH}^{total,slot,\mu}$$

denotes a total blind detection capability corresponding to numerology u, $$M_{PDCCH}^{total,slot,\mu}$$

is determined based on a maximum number of carriers for PDCCH detection by the terminal device, a maximum number of times of blind detection by the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier. The specific numerology means a numerology of a scheduling carrier corresponding to a scheduled carrier. For example, scheduled carriers include a serving cell 1, a serving cell 2 and a serving cell 3. Thus, there are three scheduled carriers in total, and an adjustment coefficient of each scheduled carrier is equal to 1. The numerator in the formula (1+1+1)/(1+1+1+2+1) is decided by an adjustment coefficient of a scheduled carrier of a specific numerology, and a total number of scheduled carriers with a specific numerology with $\mu$=0 is 3, therefore, the numerator in this formula is equal to 3. In addition, an adjustment coefficient of each scheduled carrier includes an adjustment coefficient of each of serving cells 1 to 5, and a denominator is equal to a sum of adjustment coefficients of all scheduled carriers. Therefore, the denominator is equal to 6. With reference to FIG. 3, scheduling carriers include a serving cell 1, a serving cell 3, and a serving cell 4, and scheduled carriers include a serving cell 1, a serving cell 2, a serving cell 3, a serving cell 4, and a serving cell 5. In this manner, there is further a scheduled carrier combination, that is, a combination of the serving cell 4 and the serving cell 5. Therefore, an adjustment coefficient of the serving cell 4 is 2, and an adjustment coefficient of each of the remaining serving cell 1, serving cell 2, serving cell 3 and serving cell 5 is 1, that is, a denominator in the formula is 1+1+1+2+1=6.

It may be determined based on the foregoing calculation formula of $$C_{PDCCH}^{total,slot,\mu}$$

that, a number of non-overlapped CCEs for channel estimation of a numerology u corresponding to $$C_{PDCCH}^{total,slot,\mu}$$

is determined based on a maximum number of carriers for PDCCH detection by the terminal device, a maximum number of non-overlapped CCEs for channel estimation by a terminal device on one carrier, an adjustment coefficient of each scheduled carrier, and a scheduled carrier set of a specific numerology corresponding to a scheduling carrier. A solution manner is similar to that for calculating the maximum number of PDCCH candidates, and details are not described herein again.

For the serving cell 4 and the serving cell 5, a maximum number of PDCCH candidates does not exceed $$\min(M_{PDCCH}^{max,slot,\mu}, M_{PDCCH}^{total,slot,\mu}),$$

and a maximum number of non-overlapped CCEs for channel estimation does not exceed $$\min(C_{PDCCH}^{max,slot,\mu}, C_{PDCCH}^{total,slot,\mu}).$$

For $$M_{PDCCH}^{max,slot,\mu} \text{ and } C_{PDCCH}^{max,slot,\mu},$$

refer to the foregoing Table 1 and Table 2. Herein $$M_{PDCCH}^{total,slot,\mu} \text{ and } C_{PDCCH}^{total,slot,\mu}$$

are determined in the following manner:

$$M_{PDCCH}^{total,slot,\mu} = \lfloor 2 \cdot M_{PDCCH}^{max,slot,\mu} \cdot (2+1)/(1+1+1+2+1) \rfloor$$

$$C_{PDCCH}^{total,slot,\mu} = \lfloor 2 \cdot C_{PDCCH}^{max,slot,\mu} \cdot (2+1)/(1+1+1+2+1) \rfloor$$

For the serving cell 4 and the serving cell 5, a maximum number of PDCCH candidates and a maximum number of non-overlapped CCEs for channel estimation are similar to those in the foregoing description. A difference lies in that for the serving cell 4, an adjustment coefficient of the scheduled carrier is 2, there are two adjustment coefficients of a scheduled carrier in total, and an adjustment coefficient of the serving cell 4 is 1. Therefore, the numerator in the formula (2+1)/(1+1+1+2+1) is 2+1=3, and the denominator is equal to 6.

In some embodiments, the PDCCH detection method provided in this embodiment may further include the following step:

determining, based on at least one of a DCI format of the DCI, a CIF field in the DCI, and a specific information field in the DCI, a target carrier scheduled by the DCI.

In this embodiment, for a combination of the serving cell 4 and the serving cell 5, PDCCH detection is performed based on a time-frequency resource corresponding to the serving cell 4 or the serving cell 5, and a serving cell scheduled by the DCI is identified by using CIF, a DCI format, and a specific information field in the DCI.

Figure 5:
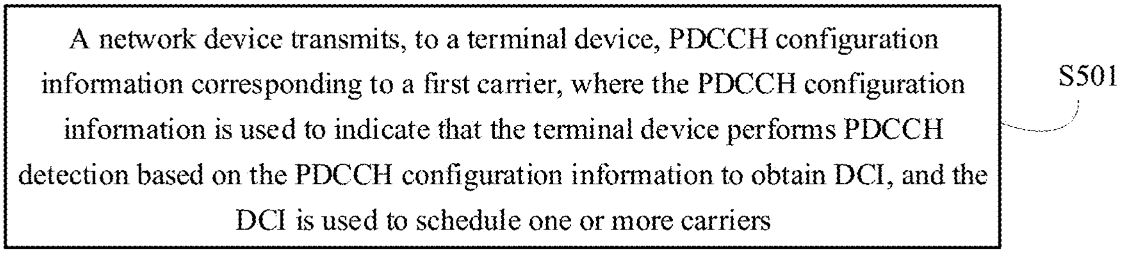
FIG. 5 is a schematic flowchart of a PDCCH detection method according to an embodiment.

Referring to FIG. 5, FIG. 5 is a schematic flowchart of a PDCCH detection method according to an embodiment. The method is applied to the network device shown in FIG. 1 as an example. The method includes the following steps.

S501. A network device transmits, to a terminal device, PDCCH configuration information corresponding to a first carrier. The PDCCH configuration information is used to indicate that the terminal device performs PDCCH detection based on the PDCCH configuration information to obtain DCI, and the DCI is used to schedule one or more carriers.

In some embodiments, one piece of PDCCH configuration information may include PDCCH configuration information of one first carrier, or may include PDCCH configuration information of a plurality of first carriers. For example, one piece of PDCCH configuration information may include PDCCH configuration information of a serving cell 1, or may include PDCCH configuration information of a serving cell 1, PDCCH configuration information of a serving cell 2, and PDCCH configuration information of a serving cell 3.

In this embodiment, the terminal device receives the PDCCH configuration information corresponding to the first carrier and transmitted by the network device, and performs PDCCH detection based on the PDCCH configuration information to obtain DCI, where the DCI is used to schedule one or more carriers.

In some embodiments, one carrier scheduled by the DCI is the first carrier, or the plurality of carriers scheduled by the DCI include the first carrier.

Same PDCCH configuration information is shared for scheduling the serving cell 4 and scheduling both the serving cell 4 and the serving cell 5. After receiving the PDCCH configuration information of the serving cell 4, the terminal device performs PDCCH detection based on the PDCCH configuration information to obtain DCI. The DCI is used to schedule one carrier, that is, the DCI is used to schedule a serving cell 4, where the serving cell 4 is one carrier scheduled by the DCI, and the serving cell 4 is the first carrier. Alternatively, the DCI is used to schedule a plurality of carriers, that is, the DCI is used to schedule a serving cell 4 and a serving cell 5, that is, the DCI is used to schedule two carriers. In this case, the first carrier is the serving cell 4, and the serving cell 4 and the serving cell 5 are two carriers scheduled by the DCI. It should be noted that, same PDCCH configuration information is shared for scheduling the serving cell 4 and scheduling both the serving cell 4 and the serving cell 5, so that signalling overheads can be reduced.

In some embodiments, the DCI includes first indication information, and the first indication information is used to indicate one or more scheduled carriers.

On the basis of foregoing embodiments, the first indication information may be set in the DCI, and the first indication information is used to indicate one or more scheduled carriers. For example, a value of the first indication information is used to identify whether to schedule the serving cell 4 or the serving cell 5, or to schedule a combination of the serving cell 4 and the serving cell 5. The first indication information is used to identify whether to schedule one carrier or to schedule a plurality of carriers.

In some embodiments, the first indication information includes a CIF field. A value of the CIF field is used to indicate one or more scheduled carriers.

For example, for the scheduled serving cell 1 or the scheduled serving cell 2 shown in FIG. 3, a value of only one CIF field needs to be configured. For the scheduled serving cell 4 or the scheduled serving cell 5, a value of one CIF field may be configured, or a value of a plurality of CIF fields may be configured.

In some embodiments, if the first indication information is used to indicate a plurality of scheduled carriers, the first indication information includes a CIF field and a specific information field in DCI, and the specific information field includes at least one of FDRA, TDRA, NDI, or HARQ process.

In some embodiments, the first indication information is configured by using higher layer signalling or is determined by using a predetermined rule.

For example, with reference to foregoing examples, in a case in which a value of one CIF field is configured for the scheduled serving cell 4 or the scheduled serving cell 5 by using higher layer signalling configuration, the network device indicates a value of a corresponding CIF field in the DCI, for example, CIF=0, indicating scheduling the serving cell 4; CIF=1, indicating scheduling the serving cell 5. In addition, for a combination of the serving cell 4 and the serving cell 5, CIF=0 is configured, that is, a value of a same CIF field is used in scheduling the combination of the scheduling serving cell 4 and the serving cell 5 and scheduling the serving cell 4, or a higher layer indicates a serving cell ID with a same value, that is, the higher layer indicates that a value of a CIF field is shared for scheduling the combination of the serving cell 4 and the serving cell 5 and scheduling which serving cell, for example, serving cell Index for CIF=Serving cell 4, that is, indicating that a value of a CIF field is shared for scheduling the combination of the scheduling serving cell 4 and the serving cell 5 and scheduling the serving cell 4.

Alternatively, the first indication information may be determined by using a predetermined rule. For a case in which a plurality of carriers are scheduled by DCI, for example, a value of same first indication information is shared for scheduling a combination of the serving cell 4 and the serving cell 5 and scheduling a serving cell with the smallest serving cell ID in a combination of multiple serving cells. For another example, a value of same first indication information is shared for scheduling a combination of the serving cell 4 and the scheduling serving cell 5 and scheduling a serving cell with the largest bandwidth of an active bandwidth part (BWP) in a combination of multiple serving cells. The foregoing combination of multiple serving cells is, for example, a combination of the serving cell 4 and the serving cell 5.

In some embodiments, the network device performs DCI size alignment on DCI formats configured by the PDCCH configuration information.

In some embodiments, that the network device performs DCI size alignment on DCI formats configured by the PDCCH configuration information may be implemented in the following manner:

performing, by the network device, DCI size alignment on the DCI formats configured by the PDCCH configuration information if a number of DCI formats configured by the PDCCH configuration information is greater than a preset threshold.

In some embodiments, that the network device performs DCI size alignment on the DCI format configured by the PDCCH configuration information includes at least one of the following:

performing DCI size alignment on at least two first-type DCI formats, where the first-type DCI format is used to schedule one carrier;

performing DCI size alignment on at least two second-type DCI formats, where the second-type DCI format is used to schedule at least two carriers; and performing DCI size alignment on the first-type DCI format and the second-type DCI format.

In some embodiments, the performing, by the network device, DCI size alignment on the DCI formats configured by the PDCCH configuration information if a number of DCI formats configured by the PDCCH configuration information is greater than a preset threshold may be implemented in the following manner:

if a number of DCI formats configured by the PDCCH configuration information is greater than a preset threshold, performing DCI size alignment on at least two first-type DCI formats, where the first-type DCI format is used to schedule one carrier;

if a number of DCI formats obtained after DCI size alignment is performed on the at least two first-type DCI formats is greater than the preset threshold, performing DCI size alignment on at least two second-type DCI formats, where the second DCI type format is used to schedule at least two carriers, and scheduling at least two carriers in two formats or scheduling at least two carriers in a format 0-3; and if a number of DCI formats obtained after DCI size alignment is performed on the at least two second-type DCI formats is greater than the preset threshold, performing DCI size alignment on the first-type DCI format and the second-type DCI format.

In some embodiments, capability detection information includes a maximum number of PDCCH candidates monitored by the terminal device and/or a maximum number of non-overlapped CCEs for channel estimation.

In some embodiments, the maximum number of PDCCH candidates is a minimum value in M_max and M_total; and the M_max is a maximum number of times of blind detection of a terminal on one carrier, and the M_total is a sum of times of blind detection of all scheduled carriers of a specific numerology corresponding to a scheduling carrier.

In some embodiments, the M_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, the M_total is determined based on a maximum number of carriers for PDCCH detection by the terminal device, a maximum number of times of blind detection performed by the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, the maximum number of non-overlapped CCEs is a minimum value in C_max and C_total; and the C_max is a maximum number of times of blind channel estimation of a terminal on one carrier, and the C_total is a sum of times of blind channel estimation of all scheduled carriers of a specific numerology corresponding to a scheduling carrier.

In some embodiments, the C_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, C_total is determined based on a maximum number of carriers for PDCCH detection by the terminal device, a maximum number of times of blind channel estimation of the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, the adjustment coefficient is a non-negative number.

In some embodiments, the adjustment coefficient is agreed upon by a protocol or configured by using higher layer signalling.

For implementation principles and beneficial effects of the PDCCH detection method on a network device side provided in embodiments of this application, reference may be made to implementation principles and beneficial effects of the PDCCH detection method on the terminal device. Details are not described herein again.

It should be understood that, although steps in the flowcharts in FIG. 2, FIG. 4, and FIG. 5 are sequentially displayed according to indication of the arrows, these steps are not necessarily sequentially performed according to a sequence indicated by the arrows. Unless expressly stated in this specification, these steps are not performed in an exact order, and these steps may be performed in another order. In addition, at least some of steps in FIG. 2, FIG. 4, and FIG. 5 may include a plurality of sub-steps or stages. These sub-steps or stages are not necessarily performed at a same time, but may be performed at different times. An execution sequence of these sub-steps or stages is not necessarily performed sequentially, but may be performed in turns or alternately with at least some of other steps or sub-steps or stages of the other steps.

Figure 6:
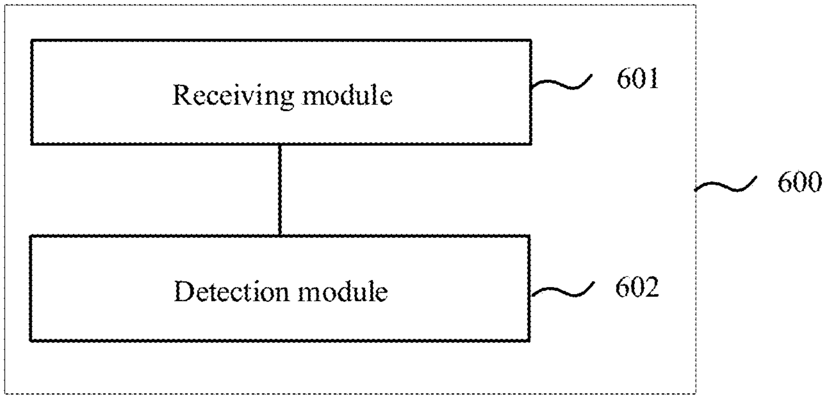
FIG. 6 is a schematic structural diagram of a terminal device according to an embodiment.

Referring to FIG. 6, FIG. 6 is a schematic structural diagram of a terminal device according to an embodiment, and the terminal device 600 includes the following modules:

a receiving module 601, configured to receive PDCCH configuration information corresponding to a first carrier and transmitted by a network device, where one piece of PDCCH configuration information may include PDCCH configuration information of one first carrier, or may include PDCCH configuration information of a plurality of first carriers, for example, one piece of PDCCH configuration information may include PDCCH configuration information of a serving cell 1, or may include PDCCH configuration information of a serving cell 1, PDCCH configuration information of a serving cell 2, and PDCCH configuration information of a serving cell 3; and a detection module 602, configured to perform PDCCH detection based on the PDCCH configuration information to obtain DCI, where the DCI is used to schedule one or more carriers.

According to the terminal device provided in this embodiment, a terminal device receives PDCCH configuration information corresponding to a first carrier and transmitted by a network device, and performs PDCCH detection based on the PDCCH configuration information to obtain DCI. The DCI is used to schedule one or more carriers, so that one or more carriers may be scheduled by using one DCI.

In some embodiments, one carrier scheduled by the DCI is the first carrier, or the plurality of carriers scheduled by the DCI include the first carrier.

For example, as shown in FIG. 3, same PDCCH configuration information is shared for scheduling the serving cell 4 and scheduling both the serving cell 4 and the serving cell 5. After receiving the PDCCH configuration information of the serving cell 4, the terminal device performs PDCCH detection based on the PDCCH configuration information to obtain DCI. The DCI is used to schedule one carrier, that is, the DCI is used to schedule a serving cell 4, where the serving cell 4 is one carrier scheduled by the DCI, and the serving cell 4 is the first carrier. Alternatively, the DCI is used to schedule a plurality of carriers, that is, the DCI is used to schedule a serving cell 4 and a serving cell 5, that is, the DCI is used to schedule two carriers. In this case, the first carrier is the serving cell 4, and the serving cell 4 and the serving cell 5 are two carriers scheduled by the DCI.

In some embodiments, the DCI includes first indication information, and the first indication information is used to indicate one or more carriers.

On the basis of foregoing embodiments, the first indication information may be set in the DCI, and the first indication information is used to indicate one or more scheduled carriers. For example, a value of the first indication information is used to identify whether to schedule the serving cell 4 or the serving cell 5, or to schedule a combination of the serving cell 4 and the serving cell 5. The first indication information is used to identify whether to schedule one carrier or to schedule a plurality of carriers.

In some embodiments, the first indication information includes a CIF field. A value of the CIF field is used to indicate one or more scheduled carriers.

In some embodiments, the first indication information includes a CIF field and another information field, different from the CIF field, in the DCI.

In some embodiments, the first indication information is configured by using higher layer signalling or is determined by using a predetermined rule.

In some embodiments, the terminal device 600 further includes:

- an alignment module, configured to perform, by the terminal device, DCI size alignment on DCI formats configured by the PDCCH configuration information.

In some embodiments, the alignment module is specifically configured to perform, by the terminal device, DCI size alignment on the DCI formats configured by the PDCCH configuration information if a number of DCI formats configured by the PDCCH configuration information is greater than a preset threshold.

In some embodiments, the alignment module is specifically configured to perform DCI size alignment on at least one of the following:

- performing DCI size alignment on at least two first-type DCI formats, where the first-type DCI format is used to schedule one carrier;
- performing DCI size alignment on at least two second-type DCI formats, where the second-type DCI format is used to schedule at least two carriers; and
- performing DCI size alignment on the first-type DCI format and the second-type DCI format.

In some embodiments, the alignment module is specifically configured to: if a number of DCI formats configured by the PDCCH configuration information is greater than a preset threshold, perform DCI size alignment on at least two first-type DCI formats, where the first-type DCI format is used to schedule one carrier; if a number of DCI formats obtained after DCI size alignment is performed on the at least two first-type DCI formats is greater than the preset threshold, perform DCI size alignment on at least two second-type DCI formats, where the second-type DCI format is used to schedule at least two carriers; and if a number of DCI formats obtained after DCI size alignment is performed on the at least two second-type DCI formats is greater than the preset threshold, perform DCI size alignment on the first-type DCI format and the second-type DCI format.

In some embodiments, the terminal device 600 further includes:

- a first determining module, configured to determine a PDCCH detection capability.

In some embodiments, the PDCCH detection capability includes a maximum number of PDCCH candidates monitored by the terminal device and/or a maximum number of non-overlapped CCEs for channel estimation.

In some embodiments, the maximum number of PDCCH candidates is a minimum value in M_max and M_total; and the M_max is a maximum number of times of blind detection of a terminal on one carrier, and the M_total is a sum of times of blind detection of all scheduled carriers of a specific numerology corresponding to a scheduling carrier.

In some embodiments, the M_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, the M_total is determined based on a maximum number of carriers for PDCCH detection by the terminal device, a maximum number of times of blind detection performed by the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, the maximum number of non-overlapped CCEs is a minimum value in C_max and C_total; and the C_max is a maximum number of times of blind channel estimation of a terminal on one carrier, and the C_total is a sum of times of blind channel estimation of all scheduled carriers of a specific numerology corresponding to a scheduling carrier.

In some embodiments, the C_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, C_total is determined based on a maximum number of carriers for PDCCH detection by the terminal device, a maximum number of times of first blind channel estimation, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, the adjustment coefficient is a non-negative number.

In some embodiments, the adjustment coefficient is agreed upon by a protocol or configured by using higher layer signalling.

In some embodiments, the terminal device 600 further includes:

- a second determining module, configured to determine, based on at least one of a DCI format of the DCI, a CIF field in the DCI, and a specific information field in the DCI, a target carrier scheduled by the DCI.

Figure 7:
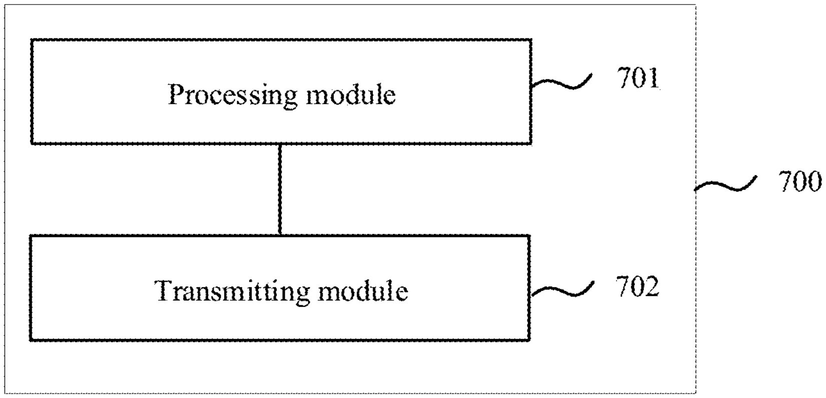
FIG. 7 is a schematic structural diagram of a network device according to an embodiment.

Referring to FIG. 7, FIG. 7 is a schematic structural diagram of a network device according to an embodiment. The network device 700 includes a processing module 701 and a transmitting module 702.

The processing module 701 is configured to transmit, to a terminal device by using the transmitting module 702, PDCCH configuration information corresponding to a first carrier. The PDCCH configuration information is used to indicate that the terminal device performs PDCCH detection based on the PDCCH configuration information to obtain DCI, and the DCI is used to schedule one or more carriers.

In some embodiments, one carrier scheduled by the DCI is the first carrier, or the plurality of carriers scheduled by the DCI include the first carrier.

In some embodiments, the DCI includes first indication information, and the first indication information is used to indicate one or more carriers.

In some embodiments, the first indication information includes a CIF field. A value of the CIF field is used to indicate one or more carriers.

In some embodiments, the first indication information includes a CIF field and another information field, different from the CIF field, in the DCI.

In some embodiments, the first indication information is configured by using higher layer signalling or is determined by using a predetermined rule.

In some embodiments, the network device further includes:

- an alignment module, configured to perform, by the network device, DCI size alignment on DCI formats configured by the PDCCH configuration information.

In some embodiments, the alignment module is specifically configured to perform, by the network device, DCI size alignment on the DCI formats configured by the PDCCH configuration information if a number of DCI formats configured by the PDCCH configuration information is greater than a preset threshold.

In some embodiments, the alignment module is specifically configured to perform DCI size alignment on at least one of the following:

- performing DCI size alignment on at least two first-type DCI formats, where the first-type DCI format is used to schedule one carrier;
- performing DCI size alignment on at least two second-type DCI formats, where the second-type DCI format is used to schedule at least two carriers; and
- performing DCI size alignment on the first-type DCI format and the second-type DCI format.

In some embodiments, the alignment module is specifically configured to: if a number of DCI formats configured by the PDCCH configuration information is greater than a preset threshold, perform DCI size alignment on at least two first-type DCI formats, where the first-type DCI format is used to schedule one carrier; if a number of DCI formats obtained after DCI size alignment is performed on the at least two first-type DCI formats is greater than the preset threshold, perform DCI size alignment on at least two second-type DCI formats, where the second DCI type format is used to schedule at least two carriers; and if a number of DCI formats obtained after DCI size alignment is performed on the at least two second-type DCI formats is greater than the preset threshold, perform DCI size alignment on the first-type DCI format and the second-type DCI format.

In some embodiments, capability detection information includes a maximum number of PDCCH candidates monitored by the terminal device and/or a maximum number of non-overlapped CCEs for channel estimation.

In some embodiments, the maximum number of PDCCH candidates is a minimum value in M_max and M_total; and the M_max is a maximum number of times of blind detection of a terminal on one carrier, and the M_total is a sum of times of blind detection of all scheduled carriers of a specific numerology corresponding to a scheduling carrier.

In some embodiments, the M_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, the M_total is determined based on a maximum number of carriers for PDCCH detection by the terminal device, a maximum number of times of blind detection performed by the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, the maximum number of non-overlapped CCEs is a minimum value in C_max and C_total; and the C_max is a maximum number of times of blind channel estimation of a terminal on one carrier, and the C_total is a sum of times of blind channel estimation of all scheduled carriers of a specific numerology corresponding to a scheduling carrier.

In some embodiments, C_total is related to an adjustment coefficient, and the adjustment coefficient includes at least one of an adjustment coefficient of each scheduled carrier and an adjustment coefficient of a scheduled carrier of a specific numerology corresponding to a scheduling carrier.

Further, the C_total is determined based on a maximum number of carriers for PDCCH detection by the terminal device, a maximum number of times of blind channel estimation of the terminal device on one carrier, an adjustment coefficient of each scheduled carrier, a scheduled carrier of a specific numerology corresponding to a scheduling carrier, and an adjustment coefficient of a scheduled carrier of a specific numerology corresponding to a scheduling carrier.

In some embodiments, the adjustment coefficient is a non-negative number.

In some embodiments, the adjustment coefficient is agreed upon by a protocol or configured by using higher layer signalling.

For a specific limitation of the terminal device, reference may be made to the foregoing limitation on a PDCCH detection method. Details are not described herein again. All or some of modules in the foregoing terminal device may be implemented by using software, hardware, and a combination thereof. The foregoing modules may be embedded in or independent of a processor in the terminal device in a hardware form, or may be stored in a memory in the terminal device in a software form, so that the processor invokes the foregoing modules to perform corresponding operations.

Figure 8:
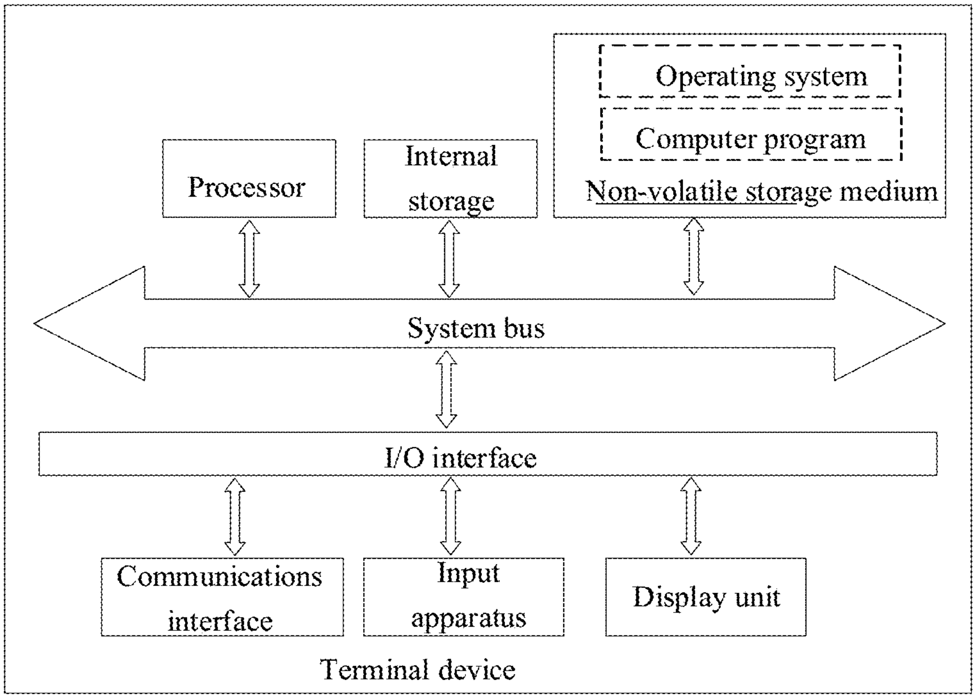
FIG. 8 is a schematic structural diagram of a terminal device according to an embodiment.

An embodiment provides a terminal device, and an internal structural diagram of the terminal device may be shown in FIG. 8. FIG. 8 is a schematic structural diagram of a terminal device according to an embodiment. The terminal device includes a processor, a memory, a communications interface, a display screen, and an input apparatus that are connected by using a system bus. The processor of the terminal device is configured to provide a computing and control capability. The memory of the terminal device includes a non-volatile storage medium and an internal memory. The non-volatile storage medium stores an operating system and a computer program. The internal memory provides an environment for running the operating system and the computer program in the non-volatile storage medium. The communications interface of the terminal device is configured to communicate with an external terminal in a wired or wireless manner. The wireless manner may be implemented by Wi-Fi, a mobile cellular network, NFC (near field communication), or another technology. The computer program is executed by the processor to implement a PDCCH detection method.

A person skilled in the art may understand that the structure shown in FIG. 8 is merely a block diagram of some structures related to solutions of this application, and does not constitute a limitation on a terminal device to which solutions of this application are applied. A specific terminal device may include more or fewer components than those shown in the figure, or combine some components, or have different component arrangements.

Figure 9:
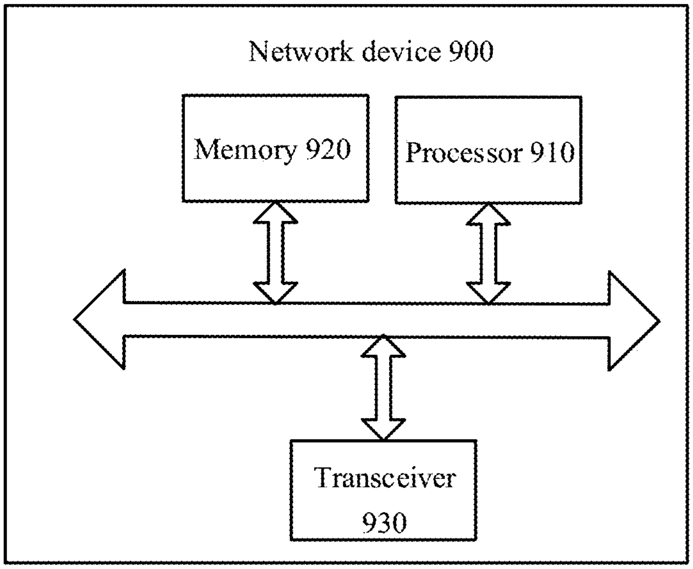
FIG. 9 is a block diagram of a network device according to an embodiment.

FIG. 9 is a schematic structural diagram of a network device according to an embodiment of this application. The network device 900 shown in FIG. 9 includes a processor 910, and the processor 910 may invoke a computer program from a memory and run the computer program to implement a method in embodiments of this application.

Optionally, as shown in FIG. 9, the network device 900 may further include a memory 920. The processor 910 may invoke a computer program from the memory 920 and run the computer program to implement a method in embodiments of this application.

The memory 920 may be a separate component independent of the processor 910, or may be integrated into the processor 910.

Optionally, as shown in FIG. 9, the network device 900 may further include a transceiver 930. The processor 910 may control the transceiver 930 to communicate with another device, and specifically, may send information or data to the another device, or receive information or data sent by the another device.

The transceiver 930 may include a transmitter and a receiver. The transceiver 930 may further include an antenna, and a quantity of antennas may be one or more.

Optionally, the network device 900 may implement corresponding procedures implemented by the terminal device in the methods in embodiments of this application. For brevity, details are not described herein again.

Figure 10:
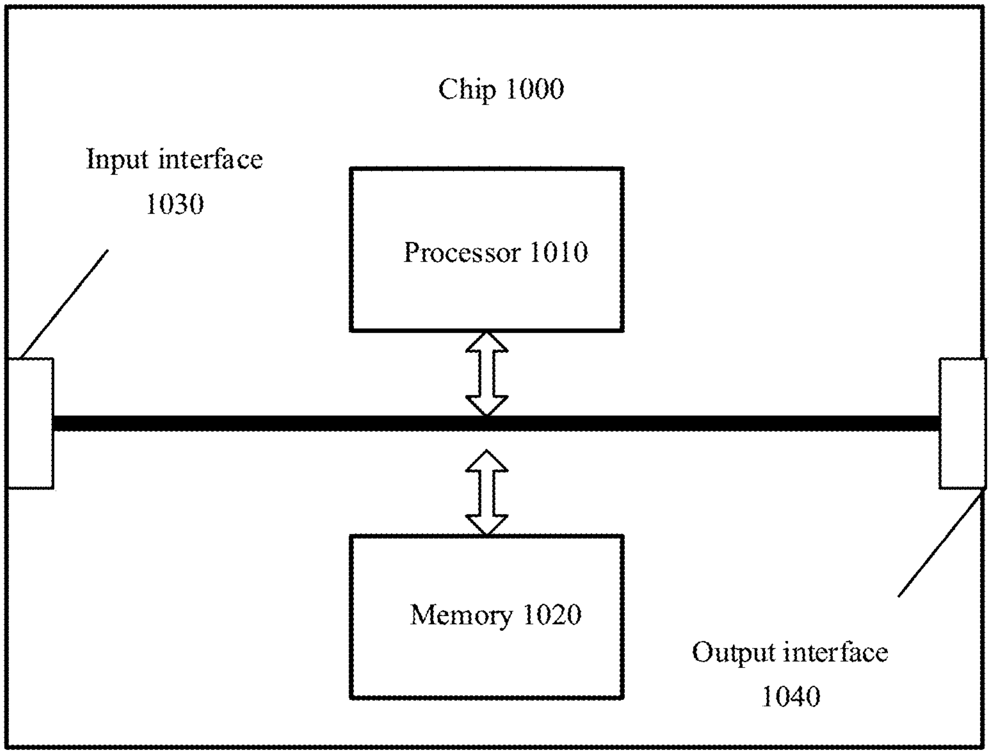
FIG. 10 is a block diagram of a chip according to an embodiment.

FIG. 10 is a schematic diagram of a structure of a chip according to an embodiment of this application. The chip 1000 shown in FIG. 10 includes a processor 1010, and the processor 1010 may invoke a computer program from a memory and run the computer program to implement a method in embodiments of this application.

Optionally, as shown in FIG. 10, the chip 1000 may further include a memory 1020. The processor 1010 may invoke a computer program from the memory 1020 and run the computer program to implement a method in embodiments of this application.

The memory 1020 may be a separate component independent of the processor 1010, or may be integrated into the processor 1010.

Optionally, the chip 1000 may further include an input interface 1030. The processor 1010 may control the input interface 1030 to communicate with another device or chip, and specifically, may obtain information or data transmitted by the another device or chip.

Optionally, the chip 1000 may further include an output interface 1040. The processor 1010 may control the output interface 1040 to communicate with another device or chip, and specifically, may output information or data to the another device or chip.

Optionally, the chip 1000 may be applied to the terminal device in embodiments of this application, and the chip 1000 may implement corresponding processes implemented by the terminal device in methods in embodiments of this application. For brevity, details are not described herein again.

It should be understood that, a processor in embodiments of this application may be an integrated circuit chip having a signal processing capability. In an implementation process, the steps in the foregoing method embodiments may be performed by using an integrated logic circuit of hardware of the processor or instructions in a software form. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams disclosed in embodiments of this application. The general-purpose processor may be a microprocessor, or the processor may be any conventional processor or the like. The steps of the methods disclosed with reference to embodiments of this application may be directly implemented by a hardware decoding processor, or may be implemented by a combination of hardware and software modules in a decoding processor. The software module may be located in a mature storage medium in the art, for example, a random access memory, a flash memory, a read-only memory, a programmable read-only memory, an erasable programmable memory, or a register. The storage medium is located in a memory. The processor reads information from the memory, and completes the steps of the foregoing methods in combination with hardware in the processor.

It may be understood that the memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus random access memory (DR RAM). It should be noted that, the memory in the systems and methods described in this specification includes but is not limited to these memories and any memory of another proper type.

It should be understood that, by way of example but not limitative description, for example, the memory in this embodiment of this application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct Rambus random access memory (DR RAM), or the like. In other words, the memory in this embodiment of this application includes but is not limited to these memories and any memory of another proper type.

An embodiment of this application further provides a computer-readable storage medium, configured to store a computer program.

In some embodiments, the computer-readable storage medium may be applied to the terminal device in embodiments of this application, and the computer program causes the terminal device to execute a procedure correspondingly implemented by the terminal device in methods in embodiments of this application. For brevity, details are not described herein again.

An embodiment of this application further provides a computer program product, which includes computer program instructions.

In some embodiments, the computer program product may be applied to the terminal device in embodiments of this application, and the computer program instructions cause the terminal device to execute a procedure correspondingly implemented by the terminal device in methods in embodiments of this application. For brevity, details are not described herein again.

An embodiment of this application further provides a computer program.

In some embodiments, the computer program may be applied to the terminal device in embodiments of this application. When the computer program runs on the terminal device, the terminal device executes a procedure correspondingly implemented by the terminal device in methods in embodiments of this application. For brevity, details are not described herein again.

A person of ordinary skill in the art may be aware that, units and algorithm steps in examples described in combination with embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be aware by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in embodiments of this application essentially, or the part contributing to the conventional technology, or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disk.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application should be subject to the protection scope of the claims.

In this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

What is claimed is:

1. A PDCCH detection method, wherein the method comprises:

receiving, by a terminal device, PDCCH configuration information corresponding to a first carrier and transmitted by a network device;

performing, by the terminal device, PDCCH detection based on the PDCCH configuration information to obtain DCI, wherein the DCI is used to schedule one or more carriers, the PDCCH configuration information is used to configure DCI formats; and performing, by the terminal device, DCI size alignment on the DCI formats configured by the PDCCH configuration information in response to that a number of the DCI formats configured by the PDCCH configuration information is greater than a preset threshold.

2. The method according to claim 1, wherein the DCI comprises first indication information, and the first indication information is used to indicate the one or more carriers.

3. The method according to claim 2, wherein the first indication information comprises a CIF field, and a value of the CIF field is used to indicate the one or more carriers.

4. The method according to claim 1, wherein the performing, by the terminal device, DCI size alignment on the DCI formats configured by the PDCCH configuration information comprises:

performing DCI size alignment on at least two second-type DCI formats, wherein the second-type DCI format is used to schedule at least two carriers.

5. The method according to claim 4, wherein the performing DCI size alignment on the DCI formats configured by the PDCCH configuration information in response to that the number of the DCI formats configured by the PDCCH configuration information is greater than the preset threshold comprises:

if a number of DCI formats configured by the PDCCH configuration information is greater than the preset threshold, performing DCI size alignment on at least two first-type DCI formats, wherein the first-type DCI format is used to schedule one carrier;

if a number of DCI formats obtained after DCI size alignment is performed on the at least two first-type DCI formats is greater than the preset threshold, performing DCI size alignment on at least two second-type DCI formats, wherein the second DCI type format is used to schedule at least two carriers; and if a number of DCI formats obtained after DCI size alignment is performed on the at least two second-type DCI formats is greater than the preset threshold, performing DCI size alignment on the first-type DCI format and the second-type DCI format.

6. The method according to claim 1, wherein the method further comprises:

determining a PDCCH detection capability.

7. The method according to claim 6, wherein the PDCCH detection capability comprises a maximum number of PDCCH candidates monitored by the terminal device and/or a maximum number of non-overlapped CCEs for channel estimation.

8. The method according to claim 7, wherein a maximum number of PDCCH candidates is a minimum value in M_max and M_total; and the M_max is a maximum number of times of blind detection performed by the terminal device on one carrier, and the M_total is a sum of times of blind detection of all scheduled carriers of a specific numerology corresponding to a scheduling carrier.

9. A network device, comprising at least one processor, and at least one memory including a computer program, wherein the at least one memory and the at least one processor are configured with the computer program, to cause the network device at least to:

transmit PDCCH configuration information corresponding to a first carrier, wherein the PDCCH configuration information is used to instruct the terminal device to perform PDCCH detection based on the PDCCH configuration information to obtain DCI, and the DCI is used to schedule one or more carriers, the PDCCH configuration information is used to configure DCI formats; and perform DCI size alignment on the DCI formats configured by the PDCCH configuration information in response to that a number of DCI formats configured by the PDCCH configuration information is greater than a preset threshold.

10. The network device according to claim 9, wherein the DCI comprises first indication information, and the first indication information is used to indicate the one or more carriers.

11. The network device according to claim 10, wherein the first indication information comprises a CIF field, and a value of the CIF field is used to indicate the one or more carriers.

12. The network device according to claim 9, wherein the network device is configured to:

perform DCI size alignment on at least two second-type DCI formats, wherein the second-type DCI format is used to schedule at least two carriers.

13. The network device according to claim 9, wherein the network device is configured to:

if a number of DCI formats configured by the PDCCH configuration information is greater than the preset threshold, perform DCI size alignment on at least two first-type DCI formats, wherein the first-type DCI format is used to schedule one carrier;

if a number of DCI formats obtained after DCI size alignment is performed on the at least two first-type DCI formats is greater than the preset threshold, perform DCI size alignment on at least two second-type DCI formats, wherein the second DCI type format is used to schedule at least two carriers; and if a number of DCI formats obtained after DCI size alignment is performed on the at least two second-type DCI formats is greater than the preset threshold, perform DCI size alignment on the first-type DCI format and the second-type DCI format.

14. The network device according to claim 9, wherein the network device is configured to:

determine a PDCCH detection capability, wherein the capability detection information comprises a maximum number of PDCCH candidates monitored by the terminal device and/or a maximum number of non-overlapped CCEs for channel estimation.

15. The network device according to claim 14, wherein a maximum number of PDCCH candidates is a minimum value in M_max and M_total; and the M_max is a maximum number of times of blind detection performed by the terminal device on one carrier, and the M_total is a sum of times of blind detection of all scheduled carriers of a specific numerology corresponding to a scheduling carrier.

16. A terminal device, comprising at least one processor, and at least one memory including a computer program, wherein the at least one memory and the at least one processor are configured with the computer program, to cause the terminal device at least to:

receive PDCCH configuration information corresponding to a first carrier and transmitted by a network device; and perform PDCCH detection based on the PDCCH configuration information to obtain DCI, wherein the DCI is used to schedule one or more carriers, the PDCCH configuration information is used to configure DCI formats; and perform DCI size alignment on the DCI formats configured by the PDCCH configuration information in response to that a number of the DCI formats configured by the PDCCH configuration information is greater than a preset threshold.

* * * * *